Patented Nov. 3, 1942

2,300,881

UNITED STATES PATENT OFFICE 2,300,881

VARNISH FOR PRINTING INKS AND COATINGS

Donald Robert Erickson and Paul J. Thoma, Kalamazoo, Mich., assignors to Michigan Research Laboratories, Inc., Kalamazoo, Mich.

No Drawing. Application June 2, 1941, Serial No. 396,290

2 Claims. (Cl. 260—29)

This invention relates to printing ink and has for its objects:

First, to provide a new and improved printing ink.

Second, to provide such an ink which is suitable for use in bread wrappers or other heat sealed wrappers or cartons because of its ability to withstand such treatment with a minimum of transferring to the hot plates ordinarily used in sealing.

Third, to provide such an ink which is easily workable and will not set up on a printing press due to the presence of high humidities and which will have the property of providing a hard film which gets harder when heated.

Other objects and advantages pertaining to details will appear from the description to follow.

Our improved ink comprises a varnish in which the binder is made up either of a resin comprising a rosin modified by an alpha beta unsaturated organic polybasic acid such as maleic or fumaric, or a terpene hydrocarbon of the formula $C_{10}H_{16}$, such as alpha terpinene, beta terpinene, pinene, alpha pinene, beta pinene, dipentene, limonene, or terpinolene, modified by such an acid or a mixture of these resins and a urea formaldehyde condensation product which is soluble in a liquid polyglycol or a melamine formaldehyde condensation product having the same property of solubility in a liquid polyglycol or a mixture of the condensation products dissolved in a liquid polyglycol such as diethylene glycol. A suitable pigment is mixed with this varnish to give the desired color. The amounts of the pigment will vary in accordance with the color requirements.

An ink made up of the above substances has distinct advantages. The film becomes gradually harder and harder after printing, due to successive degrees of polymerization of the condensation products, but the ink will stay open on a printing press even though relatively high humidity conditions are encountered. The ink has the further desirable property of being capable of treatment with steam or water spray or other means of applying water to prevent offset, since the combination of resins and condensation products will remain in solution in the liquid polyglycol, even though a limited quantity of water is present, although they will separate from the solvent when an unlimited quantity of water is added. This makes it possible to prevent offset by treatment with water although the ink does not set up on the press in the presence of a relatively high atmospheric humidity.

The urea or melamine formaldehyde condensation products cannot be used alone in solution in a polyglycol because such a solution does not have sufficient water tolerance and the condensation products would be separated by even relatively low humidities encountered in the atmosphere, making it impossible as a practical matter to roll out an ink made with such a solution for a varnish or to print it under ordinary conditions encountered in press rooms.

The ink has the very desirable property of getting harder when heat is applied and in bread wrappers or other packages where heat sealing is used the ink has the property of reducing transfer to hot plates to a minimum, when such plates are used for sealing. The heat of such a hot plate speeds up the polymerization of the condensation products, making the ink film relatively harder so that it can stand high baking temperatures.

The highly polymerized ink is also very resistant to substantially all solvents.

The melamine and urea formaldehyde condensation products are those in which the condensation has been carried out sufficiently to make the product soluble in diethylene glycol or whatever liquid polyglycol is used for the solvent in the varnish.

Examples of inks made in accordance with our invention are:

(1) 80 parts by weight of a varnish made from 50% diethylene glycol or other liquid polyglycols, and 50% of a rosin modified by an alpha beta unsaturated organic polybasic acid.

20 parts by weight of a varnish made from 50% diethylene glycol or other liquid polyglycols, and 50% urea-formaldehyde, soluble in diethylene glycol.

Pigment.

(2) 80 parts by weight of a varnish made from 50% diethylene glycol or other liquid polyglycols, and 50% of a terpene modified by an alpha beta unsaturated organic polybasic acid.

20 parts by weight of a varnish made from 50% diethylene glycol or other liquid polyglycols, and 50% melamine formaldehyde condensation product soluble in diethylene glycol.

Pigment.

(3) 80 parts by weight of a varnish made from 50% diethylene glycol or other liquid polyglycol, and 50% of a rosin modified by an alpha beta unsaturated organic polybasic acid.

20 parts by weight of a varnish made from 50% diethylene glycol or other liquid polyglycols, and 50% melamine formaldehyde condensation product soluble in diethylene glycol.

Pigment.

(4) 80 parts by weight of a varnish made from 50% diethylene glycol or other liquid polyglycol, and 50% of a terpene modified by an alpha beta unsaturated organic polybasic acid.

20 parts by weight of a varnish made from 50% diethylene glycol or other liquid polyglycols, and 50% urea-formaldehyde condensation product soluble in diethylene glycol.

Pigment.

(5) 80 parts by weight of a varnish made from 50% diethylene glycol or other liquid polyglycols, and 50% rosin and terpene modified by an alpha beta unsaturated organic polybasic acid.

20 parts by weight of a varnish made from 50% diethylene glycol or other liquid polyglycols, and 50% urea-formaldehyde and melamine-formaldehyde condensation products soluble in diethylene glycol.

Pigment.

The terms and expressions which have been herein employed are used as terms of description and not of limitation and there is no intention in the use of such terms and expressions of excluding any equivalents of the features shown and described, or portions thereof. It is recognized that various modifications are possible within the scope of the invention claimed.

Having thus described our invention, what we claim as new and desire to secure by Letters Patent is:

1. A printing ink comprising a varnish comprising 50% by weight of a polyglycol as a solvent and 40% by weight of a resin selected from the group consisting of rosin modified by an alpha beta unsaturated organic polybasic acid and a terpene hydrocarbon of the formula $C_{10}H_{16}$ modified by an alpha ,beta unsaturated organic polybasic acid, 10% by weight of a condensation product soluble in the solvent and selected from a group consisting of a urea-formaldehyde condensation product and a melamine formaldehyde condensation product, said resins having the property of separating from the solvent in a printed film of ink to prevent offset when a printed film of ink is treated with water, and a pigment.

2. A printing ink comprising a polyglycol as a solvent and a resin selected from the group consisting of rosin modified by an alpha beta unsaturated organic polybasic acid and a terpene hydrocarbon of the formula $C_{10}H_{16}$ modified by an alpha beta unsaturated organic polybasic acid, a condensation product soluble in the solvent and selected from a group consisting of a urea-formaldehyde condensation product and a melamine formaldehyde condensation product, said resins having the property of separating from the solvent in a printed film of ink to prevent offset when a printed film of ink is treated with water, and a pigment.

DONALD ROBERT ERICKSON.
PAUL J. THOMA.